Figure 1:
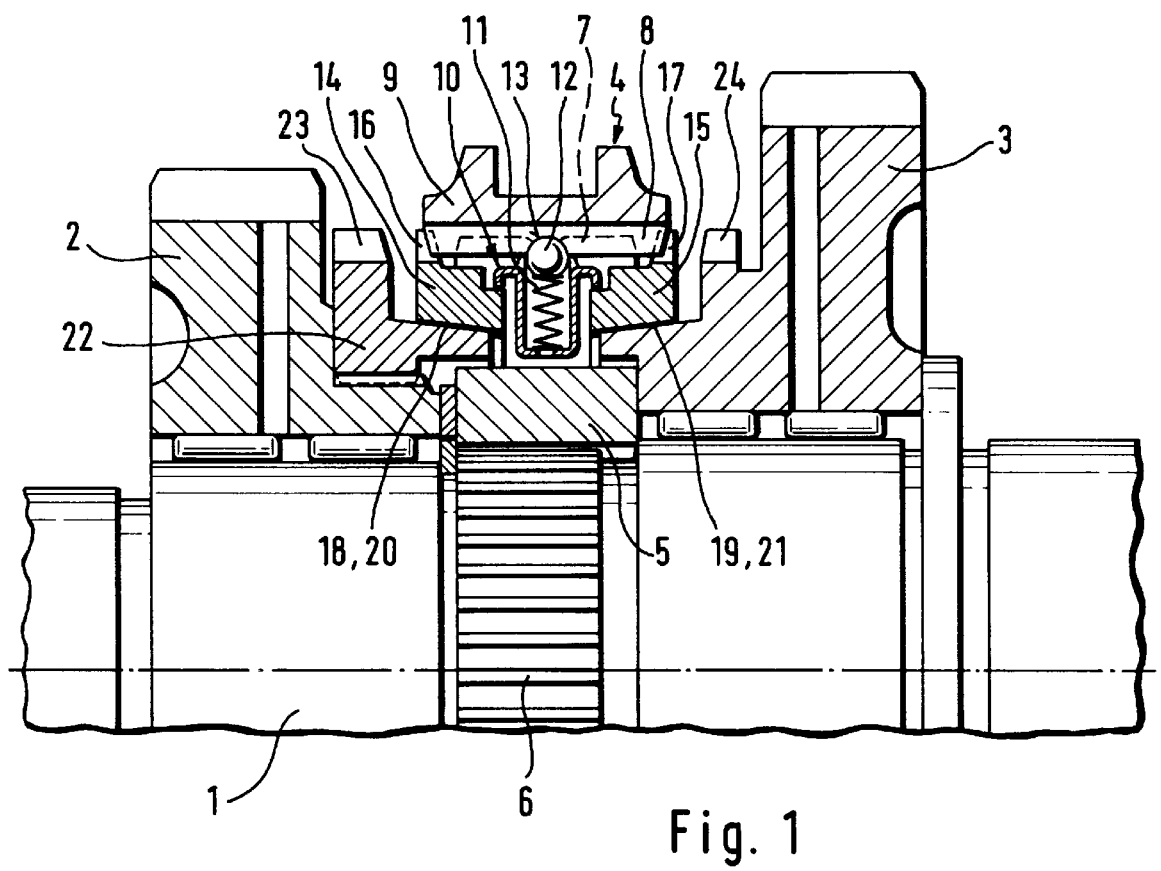

United States Patent

Ploetz et al.

[11] Patent Number: 5,887,688
[45] Date of Patent: Mar. 30, 1999

[54] SYNCHRONIZING DEVICE FOR MANUAL TRANSMISSIONS

[75] Inventors: Volker Ploetz; Wilfried Soyka, both of Herzogenaurach; Manfred Winkler, Aurachtal, all of Germany

[73] Assignee: INA Walzlager Schaeffler KG, Germany

[21] Appl. No.: 750,539

[22] PCT Filed: May 24, 1995

[86] PCT No.: PCT/EP95/01974

§ 371 Date: Nov. 19, 1996

§ 102(e) Date: Nov. 19, 1996

[87] PCT Pub. No.: WO95/33140

PCT Pub. Date: Dec. 7, 1995

[30] Foreign Application Priority Data

Jun. 1, 1994 [DE] Germany ................. 94 08 943 U

[51] Int. Cl.⁶ ........................................ F16D 23/06
[52] U.S. Cl. ................................. 192/53.341; 192/53.34
[58] Field of Search ........................ 192/53.341, 53.34, 192/53.342, 53.343, 53.361

[56] References Cited

U.S. PATENT DOCUMENTS 2,574,004  6/1951  Zingsheim .
3,086,633  4/1963  Winter ................. 192/53.361
4,059,178  11/1977  Magg et al. .
4,712,662  12/1987  Elverdam ............. 192/53.341

FOREIGN PATENT DOCUMENTS

| 1156685 | 5/1958 | France . |
| 935758 | 11/1955 | Germany . |
| 1069476 | 11/1959 | Germany . |
| 21252 | 5/1961 | Germany . |
| 2613388 | 6/1977 | Germany . |
| 2706661 | 8/1978 | Germany . |
| 3125424 | 1/1983 | Germany . |
| 576487 | 4/1946 | United Kingdom . |
| 1089606 | 11/1967 | United Kingdom . |
| 2048399 | 12/1980 | United Kingdom . |

*Primary Examiner*—Rodney H. Bonck
*Attorney, Agent, or Firm*—Bierman, Muserlian and Lucas

[57] ABSTRACT

A synchronizing device (4) comprises a thrust member (10) to initiate synchronization during a gearshifting operation, and the thrust member (10) receives a spherical locking element (12) to lock a sliding sleeve (9) in its neutral position. According to the invention, the thrust member (10) which is made as a one-piece element comprising a foot portion (26) and a head portion (27) receives the locking element (12) and a compression spring (11) in its interior and is displaceable in a T-shaped longitudinal groove (25) of an inner synchronizer ring (5).

15 Claims, 4 Drawing Sheets

SYNCHRONIZING DEVICE FOR MANUAL TRANSMISSIONS

The invention concerns a synchronizing device for manual transmissions comprising an inner synchronizer ring mounted rotationally fast on a transmission shaft, a peripheral surface of said inner sychronizer ring comprising an outer gearing and a plurality of uniformly spaced longitudinal grooves, an inner gearing of a sliding sleeve meshing with the outer gearing of the inner synchronizer ring, and thrust members engaging into said longitudinal grooves, while a spherical locking element biased by a compression spring and cooperating with a recess of the sliding sleeve projects beyond a radially outer surface of each of the thrust members inserted into the inner synchronizer ring, said thrust members cooperating with at least one outer synchronizer ring provided with a conical friction surface and a locking gear.

A synchronizing device for manual transmissions of the above type is known from DE-B 2613 388. In such a locking-type synchronizing arrangement, the thrust members arranged in the longitudinal grooves of the inner synchronizer ring serve to initiate synchronization during gearshifting i.e., to move an outer synchronizer ring against a friction surface of an adjacent clutch member. The thrust members which are configured as solid centrifugal weights cooperate through an inclined plane with the outer synchronizer rings so that an axial force acting on the outer synchronizer rings prevents a rattling of the gears during idling operation of the transmission and low-speed operation of the engine. If during up or down shifting of gears, a difference of speed occurs between the clutch member and the inner synchronizer ring, a locking gear of the outer synchronizer ring prevents a displacement of the inner gearing of the sliding sleeve into a coupling gearing of the clutch member. In each of the thrust members there is arranged a locking pin and a compression spring. The locking pin has a spherical end and locks the sliding sleeve in its neutral position in a groove. During each gearshifting operation, the locking pin is displaced in axial direction and the thrust member entrained by the sliding sleeve exerts an axial force on the outer sychronizer ring to initiate synchronization. As soon as synchronous speeds are reached between the rotating elements, the sliding sleeve can be moved further and the locking pin is displaced out of the groove of the sliding sleeve. The solid thrust member made of cast or sintered metal leads to an undesired increase of the rotating mass of the transmission and, at the same time, the thrust member is not adequately guided in the inner synchronizer ring. Moreover, the prior art sychronizing device is comprised of individual elements which can only be assembled with great difficulty. The assembly of the synchronizing device involves the mounting of small, separate parts such as the thrust member, the locking pin and the compression spring so that the manual work required is very intensive. It must also be remembered in this connection that commonly used synchronizing devices normally have four thrust members. Great problems of quality can also arise if, for example, during manual assembly, the installation of individual thrust members is forgotten.

In another synchronizing device known from DE-A 27 06 661, the thrust members are comprised of a sheet metal body extending essentially axially and a guide sleeve rigidly fixed thereto. This guide sleeve comprises a through-bore for receiving a locking element and a compression spring which is supported at one end on an abutment fixed in the inner synchronizer ring and at the other end on the spherical locking element. During every gearshifting operation, the compression is disadvantageously subjected to a bending load because the sliding sleeve displaces the thrust member together with the locking element in an axial direction of the sliding sleeve, while the opposite end of the compression spring is guided in the fixed receiving portion of the inner synchronizer ring. A further disadvantage is that for the assembly of the synchronizing device, many individual elements such as, for example, compression springs, locking balls and guide sleeves having sheet metal bodies have to be inserted individually between the inner synchronizer ring and the sliding sleeve. Errors can occur during this very complicated assembling procedure due to the many individual elements to be mounted.

It is therefore an object of the invention to obviate the above problems and to thus create a synchronizing device which can be assembled in a simple and easy manner and has a long working life. The invention further aims at reducing the rotating mass of the device.

The invention achieves these objects by the fact that the longitudinal grooves as seen in cross-section have a T-shaped outer contour and the thrust members comprise a bush-like foot portion for receiving the compression spring and the locking element, and a hollow ashler-shaped head portion connected to the foot portion. The thrust member is therefore adapted in shape to the T-shaped outer contour of the longitudinal grooves and therefore entrains the entire compression spring when displaced in the longitudinal groove. Since only a compression load now acts on the compression spring, fatigue and fracture thereof are avoided. Since the invention provides for the compression spring to be disposed in the bush-like foot portion, and the head portion connected to the foot portion receives the locking element, all these parts can be pre-assembled into a unit which can be easily mounted into the synchronizing device when this is assembled, without a danger of loss of small parts during this operation.

A synchronizing device having an element which comprises a foot portion and a head portion and is arranged in the inner synchronizer ring while receiving a locking element is, in fact, disclosed in DE-A 30 13 856. However, this element is displaceable only in radial directions and cooperates with a stop in the sliding sleeve to lock the transmission as a function of centrifugal forces. This locking action is intended to prevent inadmissible re-shifting of synchronized groups of the transmission.

In a second embodiment of the invention, a synchronizing device of the generic type likewise having an inner synchronizer ring with longitudinal grooves with T-shaped outer contour in cross-section, can have thrust members with bush-like foot portions to receive the compression spring and the locking element and, connected to the foot portion, a rectangular, disc-shaped head portion. The bush-like foot portion can therefore be made by chipless shaping and the rectangular disc-shaped head portion can be integrally formed directly thereon. This rectangular head portion projects on both sides from the cylindrical foot portion and slides on shoulders of the T-shaped longitudinal groove.

In a further development of this embodiment, the head portion can comprise a double-backed portion which merges with retaining tabs for an axial fixing of the locking element. The double-backed portion lends a greater stability to the head portion so that it is possible to form the retaining tabs directly thereon.

The head portion and the foot portion are made together as a single element out of sheet metal without chip removal. This makes it possible to manufacture the complete structural unit including the compression spring and the locking element by automatic means so that it is suitable for production in large numbers. This configuration of the thrust member, moreover, advantageously reduces the rotating mass of the device.

The bush-like foot portion comprises, at its locking element-receiving end, radially inward shaped retaining tabs which form an axial end stop for the locking element which, due to the pre-tensioning action of the compression spring, cannot migrate out of the bush-like foot portion. The end of the foot portion away from the locking element has a pot-like configuration having a bottom on which the compression spring is supported.

The retaining tabs of claim 6 are arranged in a region of the foot portion oriented towards the longitudinal groove. This prevents a contact with the sliding sleeve which would result in a raise of the gear shifting forces. Since, as mentioned above, the entire thrust member is adapted in shape to the T-shaped outer contour of the longitudinal groove while being made in one piece, the region of the thrust member comprising the retaining tabs cannot turn into a gearshifting direction so that a sluggishness of the gearbox which would then result is reliably precluded.

The lower end of the ashler-shaped head portion comprises angled guide tabs for guiding the thrust members on radially outer guide surfaces of the longitudinal grooves. These guide tabs, which are made in a simple manner by bending the sheet metal, slide smoothly on corresponding shoulders provided in the guide grooves so that a smoothness of the synchronizing operation is assured.

The recesses are provided in the part of the head portion which is at an angle to the foot portion and is situated adjacent to the retaining tabs. These punched-out recesses which are partly used for forming the retaining tabs lead to a reduction of weight of the thrust member. Due to its ashler-like configuration, the head portion, however, has a continuous and extremely stable frame so that forces active during initiation of synchronization can be transmitted to the outer synchronizer ring concerned without a deformation of the head portion.

The end of the foot portion which is situated away from the locking element and is closed by a bottom comprises a deaeration bore. Lubrication oil which enters the foot portion can be displaced therefrom through this deaeration bore during a stroke of the locking element so that the operation thereof is assured.

Finally, vertically extending angled portions can be arranged on the edges of the disc-shaped head portion of claim 2 facing the outer synchronizer rings. It is with these bent portions which extend preferably towards the sliding sleeve that the thrust member comes to bear against the outer synchronizer ring concerned.

For a further elucidation of the invention, reference is now made to the drawings in which simplified representations of four examples of embodiment are shown.

Figure 2:
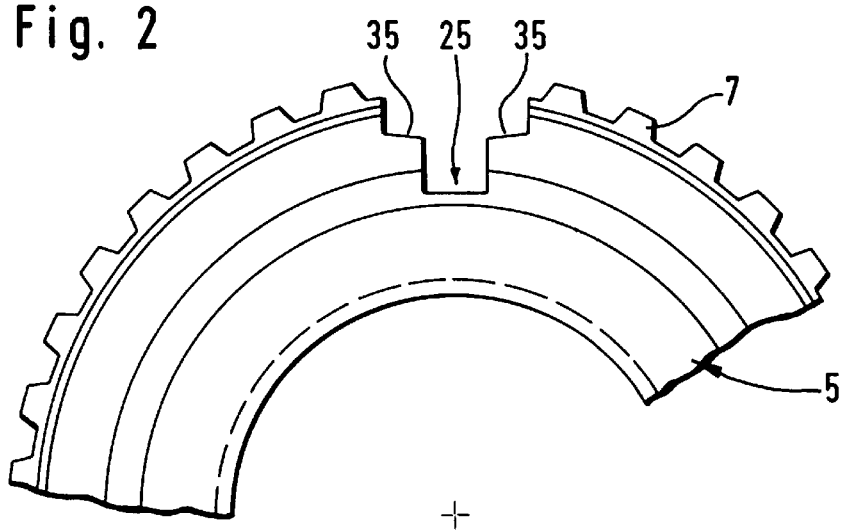
Figure 3:
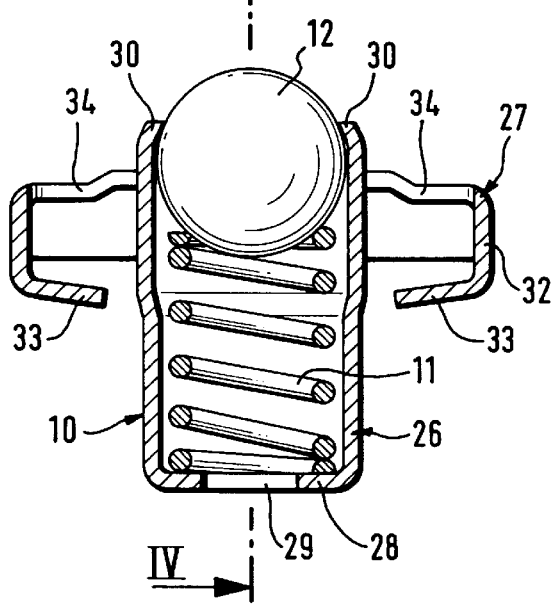
Figure 4:
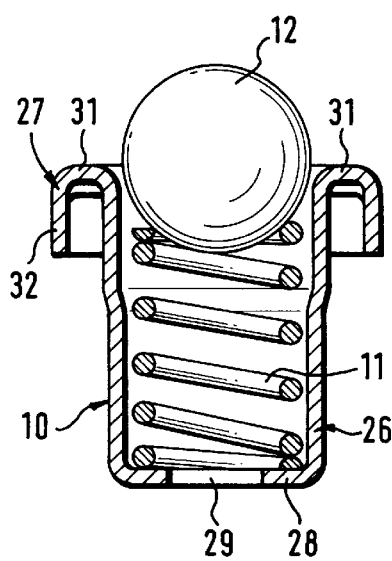
Figure 5:
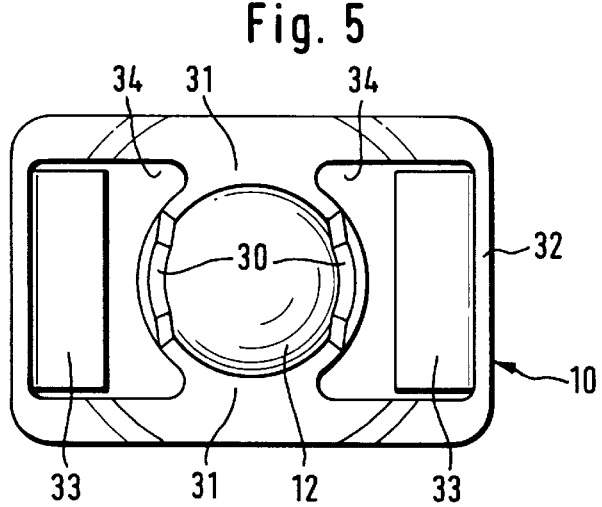
Figure 6:
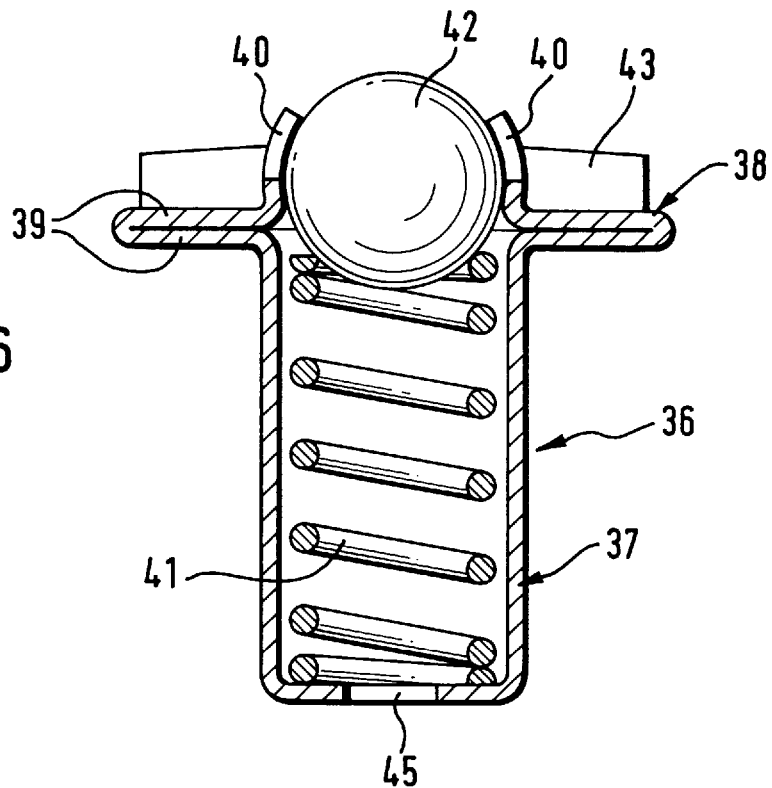
Figure 7:
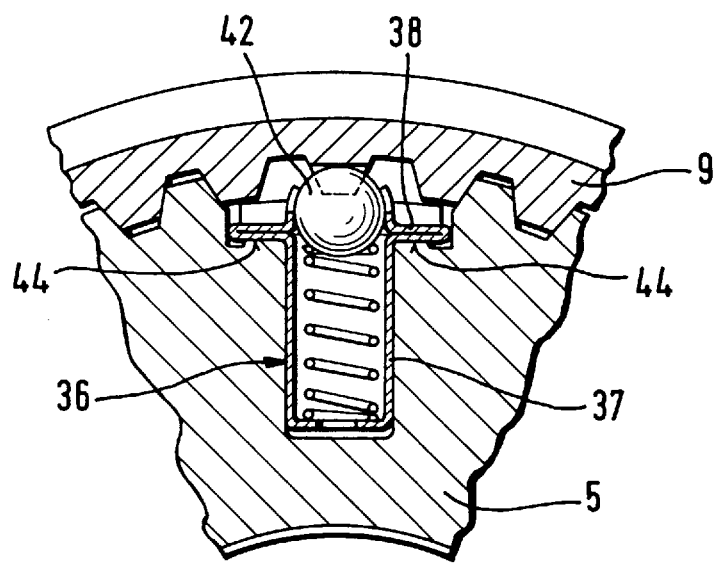
Figure 8:
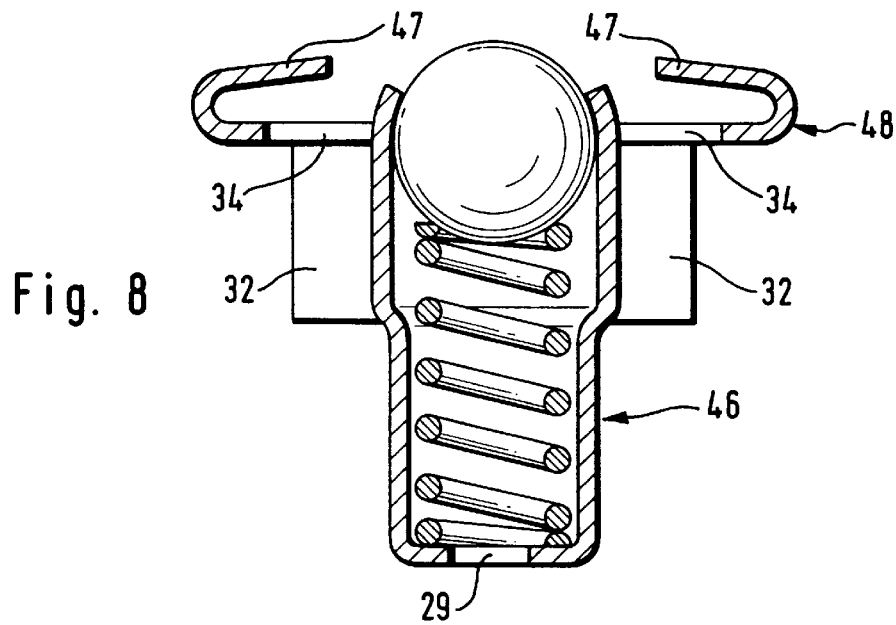
Figure 9:
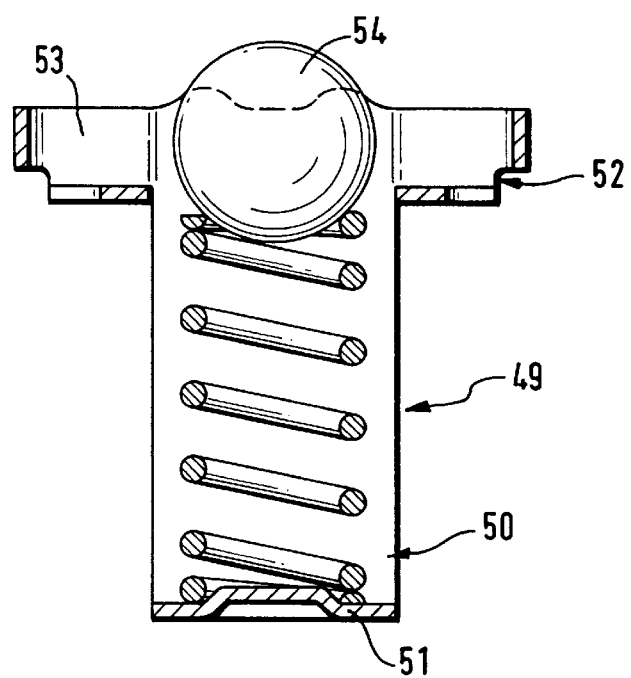
Figure 10:
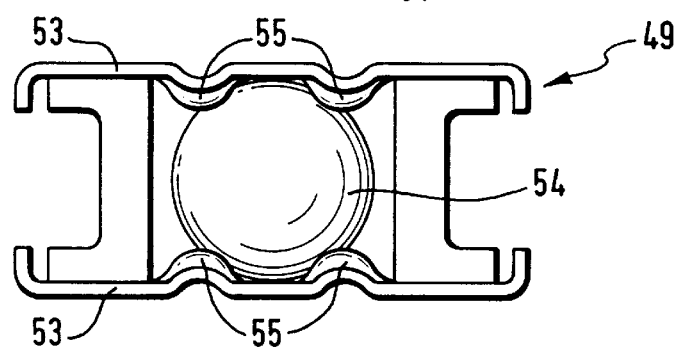

FIG. 1 is a partial longitudinal cross-section of a synchronizing device having a thrust member of the invention, FIG. 2 is a partial view of an inner synchronizer ring used in the synchronizing device of FIG. 1, FIG. 3 is a longitudinal cross-section of the thrust member of FIG. 1, FIG. 4 is a longitudinal cross-section of the thrust member along line IV—IV of FIG. 3, FIG. 5 is a top view of the thrust member of FIGS. 3 and 4, FIG. 6 is a longitudinal cross-section of a further embodiment of a thrust member in which the head portion comprises a double-backed portion, FIG. 7 is a partial cross-section of a synchronizing device having a thrust member of FIG. 6, FIG. 8 is a longitudinal cross-section of a third embodiment of a thrust member having a hollow, ashler-shaped head portion, FIG. 9 is a longitudinal cross-section of a fourth embodiment of a thrust member having an open-top, ashler-shaped head portion, and FIG. 10 is a top view of the thrust member of FIG. 9.

In FIG. 1, a shaft of an automobile gearbox referenced at 1 carries two freely rotatable idler pinions 2 and 3 and, arranged therebetween, a synchronizing device 4 which selectively couples one of these two idler pinions 2 and 3 to the shaft 1 so that the transmission is shifted into different speed ratios.

The synchronizing device 4 comprises an inner synchronizer ring 5 which meshes with the gearing 6 of the shaft 1 for rotation therewith. On the outer periphery of the inner synchronizer ring 5, there is arranged an outer gearing 7 which meshes with an inner gearing 8 of a sliding sleeve 9. A thrust member 10 made of sheet metal is guided in the inner synchronizer ring 5 and receives, in its interior, a compression spring 11 and a spherical locking element 12 which extends in longitudinal direction beyond the thrust member 10. In a neutral position of the synchronizing device 4, in which neither of the two possible gear speeds is operative and the two idler pinions 2 and 3 rotate freely relative to the shaft 1, the locking element 12 engages into a recess 13 provided in the inner gearing 8 of the sliding sleeve 9.

On each side of the thrust member 10, there is arranged an outer synchronizer ring, 14 and 15, comprising an outer locking gear, 16 and 17, and an inner friction surface 18 and 19. These friction surfaces 18 and 19 of the outer synchronizer rings 14 and 15 cooperate with friction surfaces 21 and 20 of corresponding shape provided respectively on the idler pinion 3 and on a clutch ring 22 which is connected rotationally fast to the idler pinion 2.

During gearshifting in a locking-type synchronizing arrangement, the thrust member 10 at first exerts an axial force in the initial stage of synchronization on one of the outer synchronizer rings 14 or 15 which is entrained with its friction surface 18 or 19 by the friction surface 20 or 21 and rotated through a defined angle relative to the inner synchronizer ring 5. In this position, the locking gear 16 blocks a further displacement of the sliding sleeve 9. This blocking action is neutralized only when synchronization is established between the idler pinion concerned, 2 or 3, and the shaft 1. The inner gearing 8 of the sliding ring 9 then moves through the locking gear 16 or 17, as the case may be, to come to mesh finally with a coupling gearing 23 or 24.

The special configuration of the inner synchronizer ring 5 can be seen in FIG. 2. On its outer periphery, this inner synchronizer ring 5 comprises uniformly spaced T-shaped longitudinal grooves 25 in each of which, as shown in FIG. 1, a thrust member 10 of a corresponding T-shape is arranged. The spherical locking element 12 projects out of the inner synchronizer ring 5 up to about the tip circle of the outer gearing 7. During a gearshifting movement, the sliding sleeve 9 at first entrains the thrust member 10 which exerts an axial force on the outer synchronizer ring concerned 14 or 15. When synchronization is achieved, the recess 13 releases the locking element 12. Thus the compression spring arranged within the longitudinally displaceable thrust member is subjected exclusively to a force acting in an axial direction of the compression spring 11.

As can be seen further in FIGS. 3 to 5, the thrust member 10 of the invention comprises a foot portion 26 which receives the compression spring 11 and the locking element 12, and a hollow ashler-shaped head portion 27. The thrust member 10 of the invention is made without chip removal out of sheet metal by deep drawing and therefore has a low weight. The bush-shaped foot portion 26 is partially closed at one end by a bottom 28 comprising a bore 29 which serves for deaeration and discharge of lubricant. At its end opposite the bottom 28, the foot portion comprises two radially inward shaped retaining tabs 30 which form an end stop for the spring-loaded locking element 12. The retaining tabs 30 may comprise a central recess so that they then have a fork-shaped contour (not shown). Offset at an angle of 90° to a central plane of the retaining tabs 30, there are arranged on the edge of the foot portion, connecting tabs 31 which merge with the ashler-shaped head portion 27. The head portion 27 has a continuous frame formed by vertical wall sections 32 which, in a region adjacent the retaining tabs 30 merge with angled guide tabs 33. It is with these guide tabs 33 that the thrust member 10 slides on a shoulder 35 represented in FIG. 2. As can be seen particularly in FIGS. 3 and 5, recesses 34 are provided in the outer surface of the head portion, again adjacent to the retaining tabs 30. The sheet metal sections punched out for making these recesses 34 are partly used for the forming of the retaining tabs 30.

FIGS. 1 to 5 make it clear that the invention provides a thrust member 10 which can be displaced together with its compression spring in the inner synchronizer ring 5 and which, as an integral structural unit, can receive the compression spring 11 and the locking element 12. This structural unit comprised of the foot portion 26 and the head portion 27 can be advantageously made without chip removal out of sheet metal.

FIGS. 6 to 10 show three further embodiments of the thrust member of the invention. The thrust member 36 of FIGS. 6 and 7 comprises a hollow cylindrical foot portion 37 and a head portion 38 which, as viewed from the top, has a rectangular disc-shaped configuration. The head portion 38 is formed by a double-backed portion 39 comprising end retaining tabs 40 which engage a locking element 42 biased in axial direction by a compression spring 41. From the longer sides of the rectangular head portion 38, there extend vertical, angled portions 43 which, as not shown in the figures, load the outer sychronizer rings of the synchronizing device. It can be seen in FIG. 7 that the thrust member 36 is guided in the region of its double-backed portions 39 on shoulders 44 of the inner synchronizer ring 5. Finally, the foot portion 37 also comprises a bore 45 which serves to deaerate the interior of the foot portion 37. This thrust member 36 can be manufactured in a simple manner by deep drawing and the retaining tabs 40 can advantageously be formed at the same time directly on the double-backed portion 39.

The thrust member 46 of a further embodiment differs from the embodiment of FIGS. 3 to 5 generally only in that the tabs 47 of the head portion 48 are bent upwards.

In the embodiment of FIGS. 9 and 10, the thrust member 49 comprises a hollow cylindrical foot portion 50 which has a bottom 51 shaped in its central region to serve as a centering for the spring. The head portion 52 of this thrust member 49 has a hollow ashler-like configuration and is open at its smaller ends, while angled portions 53 extend from its longer ends. A spring-loaded locking element 54 arranged in the thrust member 49 is fixed axially by being supported on beads 55 stamped onto the angled portions 55.

LIST OF REFERENCE NUMBERS

1 Shaft
2 Idler pinion
3 Idler pinion
4 Synchronizing device
5 Inner synchronizer ring
6 Gearing
7 Outer gearing of 5
8 Inner gearing of 9
9 Sliding sleeve
10 Thrust member
11 Compression spring
12 Locking element
13 Recess
14 Outer synchronizer ring
15 Outer synchronizer ring
16 Locking gear
17 Locking gear
18 Friction surface of 14
19 Friction surface of 15
20 Friction surface
21 Friction surface
22 Clutch ring
23 Coupling gearing
24 Coupling gearing
25 Longitudinal grooves
26 Foot portion
27 Head portion
28 Bottom
29 Bore
30 Retaining tabs
31 Connecting tabs
32 Vertical wall sections
33 Guide tabs
34 Recesses
35 Shoulder
36 Thrust member
37 Foot portion
38 Head portion
39 Double-backed portion
40 Retaining tabs
41 Compression spring
42 Locking element
43 Angled portions
44 Shoulders
45 Bore
46 Thrust member
47 Tabs
48 Head portion
49 Thrust member
50 Foot portion
51 Bottom
52 Head portion
53 Angled portions
54 Locking element
55 Beads

We claim:

1. A synchronizing device (4) for manual transmissions comprising an inner synchronizer ring (5) mounted rotationally fast on a transmission shaft (1), a peripheral surface of said inner synchronizer ring (5) comprising an outer gearing (7) and a plurality of uniformly spaced longitudinal grooves (25), an inner gearing (8) of a sliding sleeve (9) meshing with the outer gearing (7) of the inner synchronizer ring (5), and thrust members (10,46,49) engaging into said longitudinal grooves (25), while a spherical locking element (12, 54) biased by a compression spring (11) and cooperating with a recess (13) of the sliding sleeve (9) projects beyond a radially outer surface of each of the thrust members (10,46,49) inserted into the inner synchronizer ring (5), said thrust members (10,46,49) cooperating with at least one outer synchronizer ring (14,15) provided with a conical friction surface (18,19) and a locking gear (16,17), characterized in that the longitudinal grooves (25) as seen in cross-section have a T-shaped outer contour and the thrust members (10,46,49) are integral structural units which comprise a bush-like foot portion (26,50) which receives the compression spring (11) and the locking element (12,54), and a hollow ashler-shaped head portion (27,48,52) which is connected to the foot portion (26,50), said foot portion (26,50) is closed at one end by a bottom (28), and an end stop (30,55) for the spring-loaded locking element (12,54) is arranged at an opposite end of the foot portion (26,50) and said thrust members (10,46,49) are guided by guide tabs 33 to slide on a shoulder (35) of longitudinal grooves (25).

2. A synchronizing device (4) of claim 1 wherein the head portion (27, 38, 48, 52) and the foot portion (26, 37, 50) are made together as a single element out of sheet metal without chip removal.

3. A synchronizing device (4) of claim 2 wherein the bush-like foot portion (26) comprises, at an thereof which receives the locking element (12), radially inward shaped retaining tabs (30) (FIGS. 3, 5, 8).

4. A synchronizing device (4) of claim 3 wherein the retaining tabs (30) are arranged in a region adjacent to edges of the longitudinal grooves (25).

5. A synchronizing device (4) of claim 3 wherein recesses (34) are provided in a part of the head portion (27, 48) which is at an angle to the foot portion (26) and is situated adjacent to the retaining tabs (30) (FIGS. 3, 5 and 8).

6. A synchronizing device (4) of claim 2 wherein an end of the foot portion (26, 37) which is situated away from the locking element (12, 42) comprises a deaeration bore (29, 45) (FIGS. 3, 4, 6, 8).

7. A synchronizing device (4) for manual transmissions comprising an inner synchronizer ring (5) mounted rotationally fast on a transmission shaft (1), a peripheral surface of said inner synchronizer ring (5) comprising an outer gearing (7) and a plurality of uniformly spaced longitudinal grooves (25), an inner gearing (8) of a sliding sleeve (9) meshing with the outer gearing (7) of the inner synchronizer ring (5), and thrust members (10,46,49) engaging into said longitudinal grooves (25), while a spherical locking element (12, 54) biased by a compression spring (11) and cooperating with a recess (13) of the sliding sleeve (9) projects beyond a radially outer surface of each of the thrust members (10,46,49) inserted into the inner synchronizer ring (5), said thrust members (10,46,49) cooperating with at least one outer synchronizer ring (14,15) provided with a conical friction surface (18,19) and a locking gear (16,17), characterized in that the longitudinal grooves (25) as seen in cross-section have a T-shaped outer contour and the thrust members (36) are integral structural units which comprise a bush-like foot portion (37) which receives the compression spring (41) and the locking element (42), and a rectangular disc-shaped head portion (38) which is connected to the foot portion (37), said foot portion (37) is closed at one end by a bottom, and an end stop (40) for the spring-loaded locking element (42) is arranged at an opposite end of the foot portion (37) and said thrust members (10,46,49) are guided by guide tabs 33 to slide on a shoulder (35) of longitudinal grooves (25).

8. A synchronizing device (4) of claim 7 wherein the head portion (38) comprises a double-backed portion (39) (FIGS. 6 and 7).

9. A synchronizing device (4) of claim 8 wherein the double-backed portion (39) merges with retaining tabs (40) which fix the locking element (42) in axial direction (FIGS. 6 and 7).

10. A synchronizing device (4) of claim 7 wherein extending angled portions (43) are arranged on edges of the disc-shaped head portion (38) facing the outer synchronizer rings (14, 15) (FIGS. 6 and 7).

11. A synchronizing device (4) of claim 7 wherein the head portion (27,38,48,52) and the foot portion (26,37,50) are made together as a single element out of sheet metal without chip removal.

12. A synchronizing device (4) of claim 11 wherein the bush-like foot portion (26) comprises, at an end thereof which receives the locking element (12), radially inward shaped retaining tabs (30).

13. A synchronizing device (4) of claim 12 wherein the retaining tabs (30) are arranged in a region adjacent to edges of the longitudinal grooves (25).

14. A synchronizing device (4) of claim 12 wherein recesses (34) are provided in a part of the head portion (27,48) which is at an angle to the foot portion (26) and is situated adjacent to the retaining tabs (30).

15. A synchronizing device (4) of claim 11 wherein an end of the foot portion (26,37) which is situated away from the locking element (12,42) comprises a deaeration bore (29, 45).

* * * * *